United States Patent
Duvert et al.

(10) Patent No.: US 11,207,232 B2
(45) Date of Patent: Dec. 28, 2021

(54) MAGNETIC SUSPENSION SYSTEM

(71) Applicant: TRUMPF MEDIZIN SYSTEME GMBH + CO. KG, Saalfeld (DE)

(72) Inventors: Jean-Bernard Duvert, Auray (FR); Philippe Kaikenger, Pluvigner (FR); Eric D. Agdeppa, Cincinnati, OH (US); Guenter Loeffl, Saalfeld (DE); Ibne Soreefan, West Chester, OH (US)

(73) Assignee: TRUMPF MEDIZIN SYSTEME GMBH + CO. KG, Saalfeld (DE)

( * ) Notice: Subject to any disclaimer, the term of this patent is extended or adjusted under 35 U.S.C. 154(b) by 116 days.

(21) Appl. No.: 16/556,759

(22) Filed: Aug. 30, 2019

(65) Prior Publication Data

US 2020/0078246 A1 Mar. 12, 2020

(30) Foreign Application Priority Data

Sep. 12, 2018 (EP) .................................... 18194108

(51) Int. Cl.
| | |
|---|---|
| *F16M 11/00* | (2006.01) |
| *A61G 12/00* | (2006.01) |
| *A61G 7/10* | (2006.01) |
| *F16M 13/02* | (2006.01) |
| *H01F 7/02* | (2006.01) |

(52) U.S. Cl.
CPC ............ *A61G 12/004* (2013.01); *A61G 7/104* (2013.01); *F16M 13/022* (2013.01); *F16M 13/027* (2013.01); *H01F 7/02* (2013.01)

(58) Field of Classification Search
CPC ...... A61G 7/04; A61G 12/004; F16M 13/022; F16M 13/027; A61B 6/0487
See application file for complete search history.

(56) References Cited

U.S. PATENT DOCUMENTS

| | | | | | |
|---|---|---|---|---|---|
| 3,777,834 | A | * | 12/1973 | Hiraoka | B62D 55/265 180/9.44 |
| 3,973,711 | A | * | 8/1976 | Perego | B23K 3/08 228/32 |
| 5,633,707 | A | * | 5/1997 | Seemann | B62D 55/265 356/35.5 |
| 6,000,484 | A | * | 12/1999 | Zoretich | B05B 13/005 180/21 |
| 6,276,478 | B1 | * | 8/2001 | Hopkins | B63B 71/00 180/164 |

(Continued)

FOREIGN PATENT DOCUMENTS

| | | |
|---|---|---|
| JP | 8-59200 A | 3/1996 |
| JP | 2869863 | 3/1999 |

(Continued)

*Primary Examiner* — Amy J. Sterling
(74) *Attorney, Agent, or Firm* — Barnes & Thornburg LLP

(57) ABSTRACT

A magnetic suspension system for a medical device is provided. The magnetic suspension system comprises a support structure having an area provided with a ferromagnetic characteristic, and a carriage comprising a magnet exerting a magnetic attraction force between the carriage and the support structure. The carriage comprises a friction reducing device and a drive device configured to drive a motion of the carriage upon the support structure in an arbitrary predetermined direction, the drive device being separate from the friction reducing device.

20 Claims, 6 Drawing Sheets

(56) References Cited

U.S. PATENT DOCUMENTS

| | | | | |
|---|---|---|---|---|
| 6,671,582 B1 * | 12/2003 | Hanley | ................... | B25J 5/007 |
| | | | | 700/245 |
| 10,829,171 B2 * | 11/2020 | Parrott | ................. | B62D 57/024 |
| 2012/0266379 A1 | 10/2012 | Hushek | | |

FOREIGN PATENT DOCUMENTS

| | | |
|---|---|---|
| JP | 2004-298313 | 10/2004 |
| WO | WO2015/023539 | 2/2015 |
| WO | WO2018/025230 | 2/2018 |
| WO | WO2018/158706 | 9/2018 |

* cited by examiner

MAGNETIC SUSPENSION SYSTEM

CROSS-REFERENCE TO RELATED APPLICATIONS

This application claims the benefit of European Patent Application Serial No. 18194108.9, filed on Sep. 12, 2018, the entire disclosure of which is incorporated herein by reference in its entirety.

BACKGROUND

The invention relates to a magnetic suspension system, in particular, to a magnetic suspension system for suspending medical devices to a room ceiling.

SUMMARY

Heretofore, medical devices fixable to a room ceiling are rigidly fixed to the ceiling. Depending on the load, i.e., its own weight, a load capacity of a loading, and handling forces, appropriate fixation devices are used for fixing the medical device to the ceiling. Usually steel plates to which the medical devices are attachable are fixed to the ceiling by dowels. The medical devices are supplied by supply mains usually installed above a false ceiling.

Due to the rigid fixation of the medical devices, in case that there is a demand for a movability of the medical device or of portions of it, the medical devices themselves need to have moving structures as, e.g., arms or cantilevers. However the working range enabled by the moving structures is limited by the length of the moving structures which, in turn, depends on the load on the moving structure. Therefore, the working range is quite limited and, in any case, a redesign of, e.g., an operating theatre, implicates enormous construction measures.

Document WO 2015/023539 A1 discloses a magnetic conveyance system which can be utilized in residential, commercial or industrial applications and which provides lifting and mobility assistance anywhere a related support structure is installed. In particular, this document discloses the conveyance system in conjunction with a mobility system for elderly or physically disabled persons. During use of this magnetic conveyance system, the person can freely move, e.g., in a room, while being supported by a harness attached to a trolley of the conveyance system.

However, moving a trolley carrying a medical device is much heavier than supporting a person such that merely manually pushing or pulling is hardly possible, in particular, in view of a short reorganization time, e.g., in operating theaters.

Therefore, the object underlying the invention is to remedy the above disadvantageous and to provide a magnetic suspension system or a medical device capable of carrying heavy loads and assisting operators in moving the loads.

The object is achieved by a magnetic suspension system according to claim 1 and a medical device according to claim 12. Advantageous further developments are subject-matters of the dependent claims.

According to an aspect of the invention, a magnetic suspension system comprises a plate-shaped support structure having an area provided with a ferromagnetic characteristic, and a carriage comprising a magnet exerting a magnetic attraction force between the carriage and the support structure. The carriage comprises a friction reducing device, and a drive device configured to drive a motion of the carriage upon the support structure in an arbitrary predetermined direction, the drive device being separate from the friction reducing device.

By the magnetic suspension system having a friction reduction device and a drive device, also moving of heavy loads suspended by the suspension system is easily possible such that a short reorganization time, e.g., in operating theaters, can be realized. Due to the provision of the drive device separate from the friction reducing device, the carriage respectively optimized for its task can be provided.

In an advantageous implementation of the magnetic suspension system, the drive device comprises an electric motor and a control device configured to actuate the drive device to drive the motion of the carriage in the predetermined direction.

By the provision of the electric motor and the control device, an exact control of the motion of the magnetic suspension system is possible in order to reach a requested position of the carriage.

In a further advantageous implementation of the magnetic suspension system, the drive device comprises at least two rollers configured to roll upon the support structure.

By the at least two rollers, the magnetic suspension system can be oriented into an arbitrary motion direction and, then, a travel of the carriage in the adjusted direction can be performed.

In a further advantageous implementation of the magnetic suspension system, the drive device comprises a preload element configured to press the rollers against the support structure.

The preload element pressing the rollers against the support structure allows enough friction between the rollers and the support structure, so that slippage-free propelling the carriage is possible in order to ensure exact controlled positioning of the carriage.

In a further advantageous implementation of the magnetic suspension system, the drive device comprises an actuator configured to actuate the preload element to press the defined roller against the support structure.

Due to a selective pressing of the defined roller against the support structure, the rollers necessary for executing a requested motion of the carriage can be pressed against the support structure. Therefore, rollers which, due to their orientation, would hinder the requested motion can be prevented from being pressed to the support structure. Furthermore, in case of soft rollers, flattening due to a constant pressure on the rollers can In a further advantageous implementation of the magnetic suspension system, the rollers comprise low-pressure tires.

When using low-pressure tires, high friction can be achieved by a low pressing force to the low-pressure tires towards the support structure. Therefore, the preload element can be constructed smaller which safes installation space and manufacturing costs. Additionally, the force against the magnetic attraction force between the carriage and the support structure is smaller such that the magnet of the carriage can be designed to provide a weaker attraction force, wherein, nevertheless, a requested safety against falling down can still be ensured.

In a further advantageous implementation of the magnetic suspension system, the magnetic suspension system comprises a removal device configured to remove the carriage from the support structure.

By the provision of the removal device, removing the magnetic suspension system and devices attached thereto, e.g. for servicing the magnetic suspension system or the device attached thereto, is enabled or facilitated.

In a further advantageous implementation of the magnetic suspension system, the carriage comprises the removal device configured to enlarge a distance between the magnet of the support structure and the carriage.

When providing the removal device at the carriage, the removal device can reduce the attraction force between the magnet of the carriage and the support structure. Therefore, removal of the carriage at any requested position of the carriage on the support structure is possible.

In a further advantageous implementation of the magnetic suspension system, the removal device comprises a bolt configured to approach the support structure when being rotated in a predefined rotational direction.

Using a bolt for enlarging the distance between the magnet of the support structure and the carriage, a simple and economic solution for removing the carriage from the support structure is provided.

In another advantageous implementation of the magnetic suspension system, the support structure comprises an area having a non-ferromagnetic characteristic, and the carriage is configured to enter the area having a non-ferromagnetic characteristic for being removed from the support structure.

By this configuration of the support structure, an easy removal of the carriage without any additional devices is possible.

In another advantageous implementation of the magnetic suspension system, the support structure comprises a detachable portion having an area provided with a ferromagnetic characteristic, the portion being detachable from a remaining portion of the support structure for removing the carriage located in this portion.

By this kind of removal device, a defined removal of the carriage from the support structure is possible without a sudden downward motion of the carriage when the weight of the carriage and the device attached thereto exceeds the magnetic attraction force.

According to another aspect of the invention, a medical device comprises the magnetic suspension system, a supply main for supplying the medical device with at least one of energy, gases and control signals, and magnetic carriers configured to support and guide the supply main, the magnetic carriers respectively comprising a magnet and being attachable to the support structure by magnetic force.

The medical device configured in this way can be easily moved upon the support structure to a requested location while being constantly supplied with necessary energy, gases and control signals. The supply main is prevented from hanging down in a disturbing manner from the ceiling and it can follow the medical device.

In an advantageous implementation of the medical device, the medical device is configured to supply and carry medical apparatuses, the medical device being a ceiling mounted support system or a modular boom.

By this medical device, provision and supply of medical apparatuses at locations appropriate for their intended use is possible. Moreover, changing a configuration of medical devices in, e.g., an operating theater can be performed in an easy and fast manner.

In another advantageous implementation of the medical device, the medical device comprises a lighting system.

When using this medical device, illumination of, e.g., a surgical site can be executed and a change of the illumination direction can be performed without the need of a complicated suspension structure comprising several arms.

In another advantageous implementation of the medical device, the medial device comprises a patient hoist.

By this medical device, a mobility of a physically disabled person cannot merely be assisted but also, e.g., paraplegic persons can be mobile when using the medial device provided with the drive.

BRIEF DESCRIPTION OF THE DRAWINGS

Now, the invention is elucidated by means of embodiments referring to the attached drawings.

In particular.

DETAILED DESCRIPTION OF THE DRAWINGS

Figure 1:
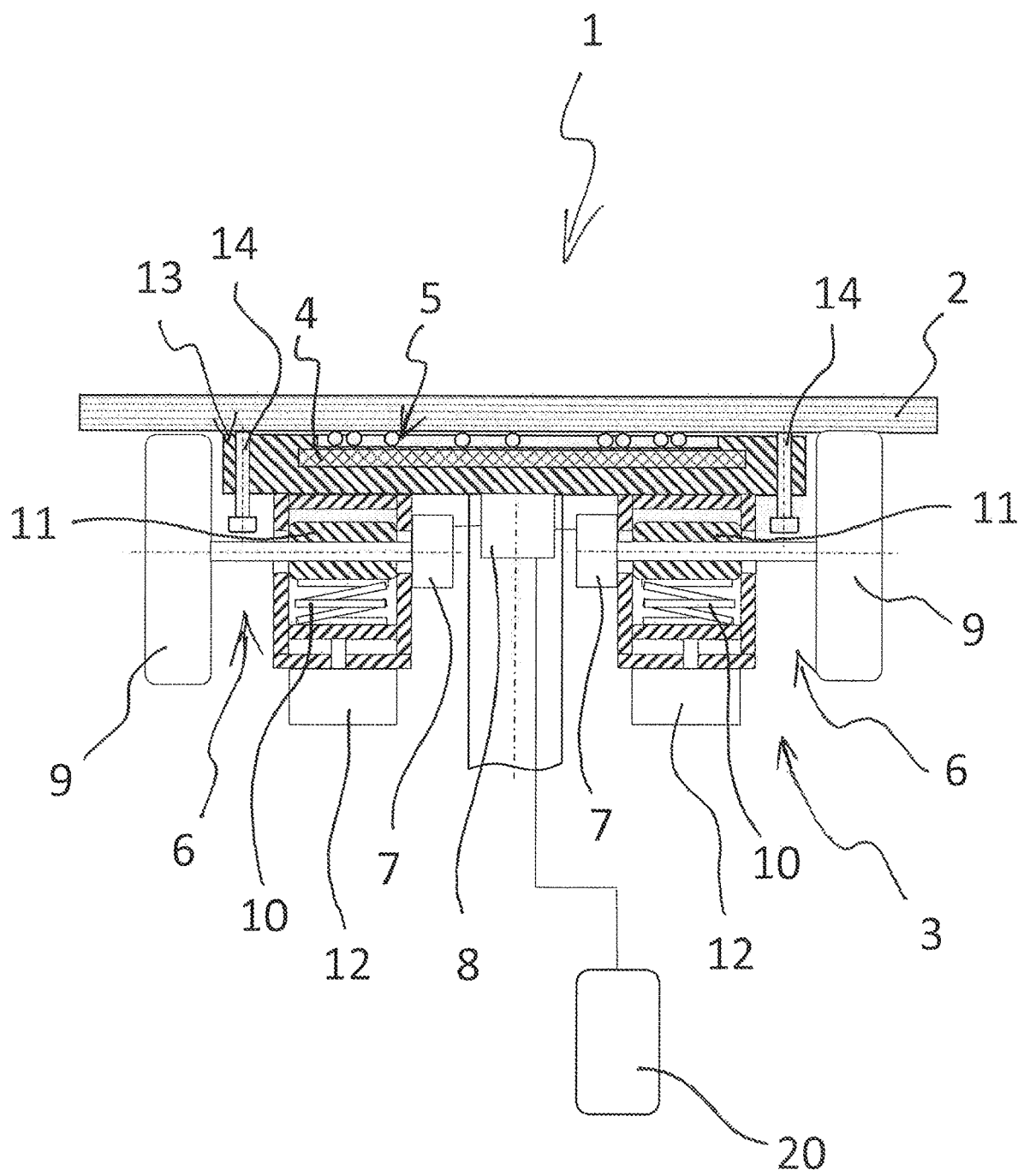
FIG. 1 shows a sectional side view of a principle illustration of a magnetic suspension system according to a first embodiment of the invention.

FIG. 1 shows a sectional side view of a principle illustration of a magnetic suspension system 1 according to a first embodiment of the invention.

The magnetic suspension system 1 comprises a plate-shaped support structure 2 having an area provided with a ferromagnetic characteristic. In this embodiment, the suspension system 2 is formed by a steel plate attached to a ceiling of a room. Alternatively, other materials or shapes of the suspension system, e.g., panels, are possible.

Furthermore, the magnetic suspension system 1 comprises a carriage 3 comprising a magnet 4 exerting a magnetic attraction force between the carriage 3 and the support structure 2. The magnet 4 is formed by a permanent magnet. However, alternatively, the magnet 4 can be formed of an electromagnet. In this alternative embodiment, a fail-safe construction is required to prevent falling down of the carriage 3.

The carriage 3 further comprises a friction reducing device 5. The friction reducing device 5 comprises balls in order to avoid static friction. Alternatively, other kinds of friction reducing devices, e.g., a sliding surface having a very small friction coefficient, is possible.

The carriage 3 is further provided with a drive device 6 configured to drive a motion of the carriage 3 upon the support structure 2 in an arbitrary predetermined direction. The drive device 6 is configured to be separate from the friction reducing device 5.

The drive device 6 comprises two electric motors 7 and a control device 8 connected to the electric motors 7. The control device 8 is configured to actuate the drive device 6 to drive the motion of the carriage 3 in the predetermined direction. The control device 8 is provided with a remote control 20. Alternatively, the control device 8 can be controlled by another controller provided in the room or being connected to the controller 8, e.g., via a network.

The drive device 6 comprises two rollers 9 configured to roll upon the support structure 2. In this embodiment, the two rollers 9 are respectively driven by a separate electric motor 7. Alternatively, one motor 7 comprising an appropriate clutch and gear system is possible. In a further alternative embodiment, more than two rollers 9 are provided. Moreover, alternatively, due to a holding torque of the motor 7, the motor acts as a braking system to cause the carriage 3 to stay in place.

The drive system 6 further comprises a preload element 10 configured to press a defined roller 9 against the support structure 2. In this embodiment, the preload element 10 is formed by a coil spring, however, alternatively, a spring having another shape, a bumper, or another suitable preload element can be used. The preload element 10 presses a support block 11 supporting a shaft of the roller 9 towards the support structure 2.

The drive device 6 comprises an actuator 12 configured to actuate the preload element 10 to press the defined roller 9 against the support structure 2. The defined roller 9 is the roller 9, the shaft of which is supported by the support block 11 pressed by the respective preload element 10. Alternatively, the drive device 6 is not provided with the actuator 12 and the preload is statically provided.

The rollers 9 comprise low-pressure tires. In alternative embodiments, solid rubber rollers or rollers made of steel having a rubber film can be used.

The magnetic suspension system 1 is provided with a removal device 13 configured to remove the carriage 3 from the support structure 2. In the first embodiment of the magnetic suspension system 1, the removal device 13 is configured to enlarge a distance between the magnet 4 of the carriage and the support structure 2. When the distance is enlarged, the magnetic attraction force is reduced and the carriage 3 can be removed from the support structure 2. The removal device 13 comprises two bolts 14 configured to approach the support structure 2 when being rotated in a predefined rotational direction. In an alternative embodiment, one or more than two bolts 14 can be provided for enlarging the distance between the magnet 4 and the support structure 2.

Figure 2:
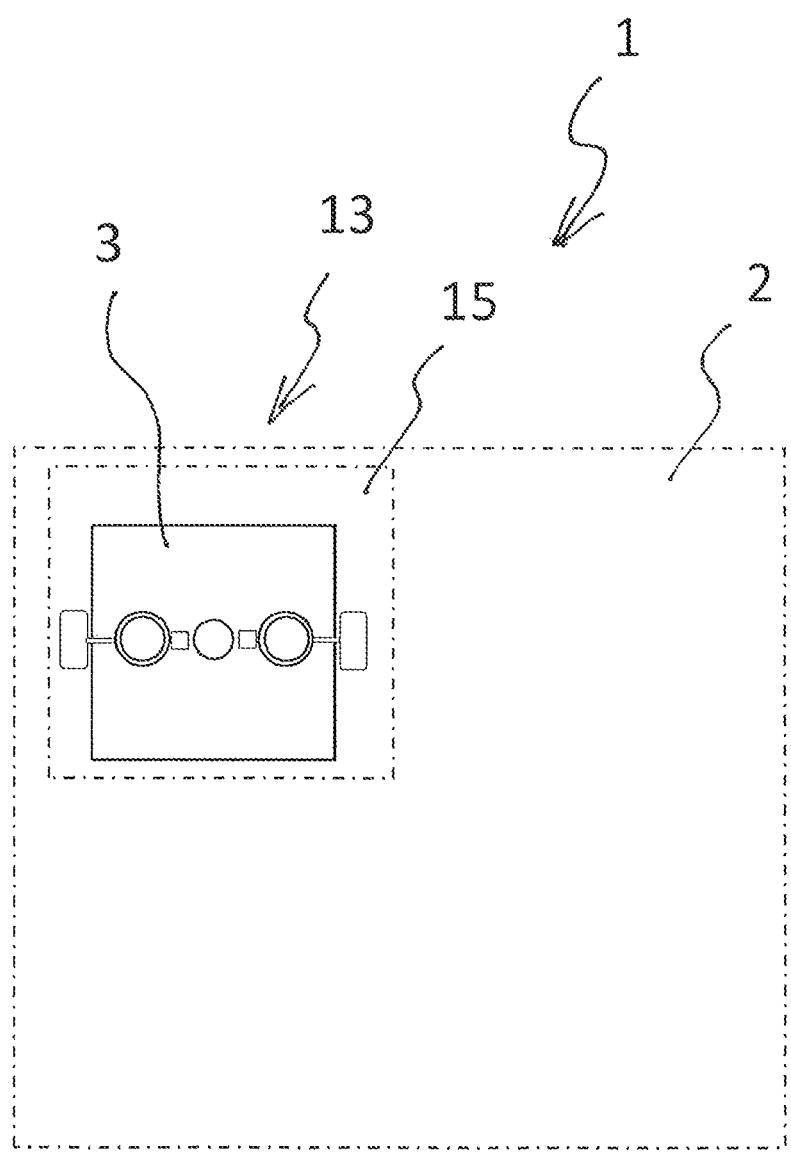
FIG. 2 shows a principle illustration from below to a magnetic suspension system according to a second embodiment of the invention.

FIG. 2 shows a principle illustration from below to a magnetic suspension system 1 according to a second embodiment of the invention.

In this embodiment of the magnetic suspension system 1, the support structure 2 comprises an area 15 having a non-ferromagnetic characteristic as the removal device 13, and the carriage 3 is configured to enter the area 15 having the non-ferromagnetic characteristic for being removed from the support structure 2.

Figure 3:
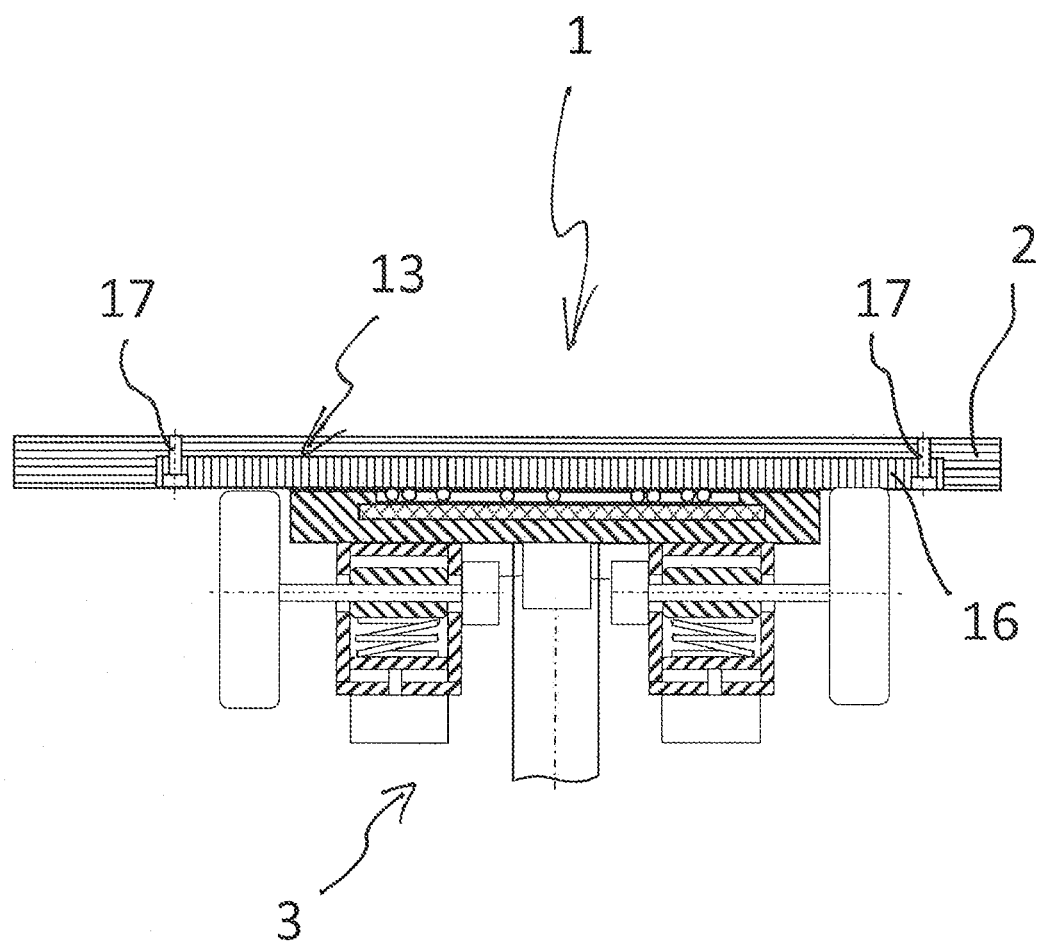
FIG. 3 shows a sectional view of a principle illustration of a magnetic suspension system according to a third embodiment of the invention.

FIG. 3 shows a sectional view of a principle illustration of a magnetic suspension system 1 according to a third embodiment of the invention.

In this embodiment of the magnetic suspension system 1, the support structure 2 comprises a detachable portion 16 having an area provided with a ferromagnetic characteristic, the portion 16 is detachable from a remaining portion of the support structure 2 for removing the carriage 3 located in this portion 16.

The detachable portion 16 is fixed to the remaining portion of the support structure 2 by fixation bolts 17. The number of the bolts 17 depends on the load capacity of the bolts 17, the remaining portion of the support structure 2, the detachable portion, and the weight of the carriage 3 including its working load.

Figure 4:
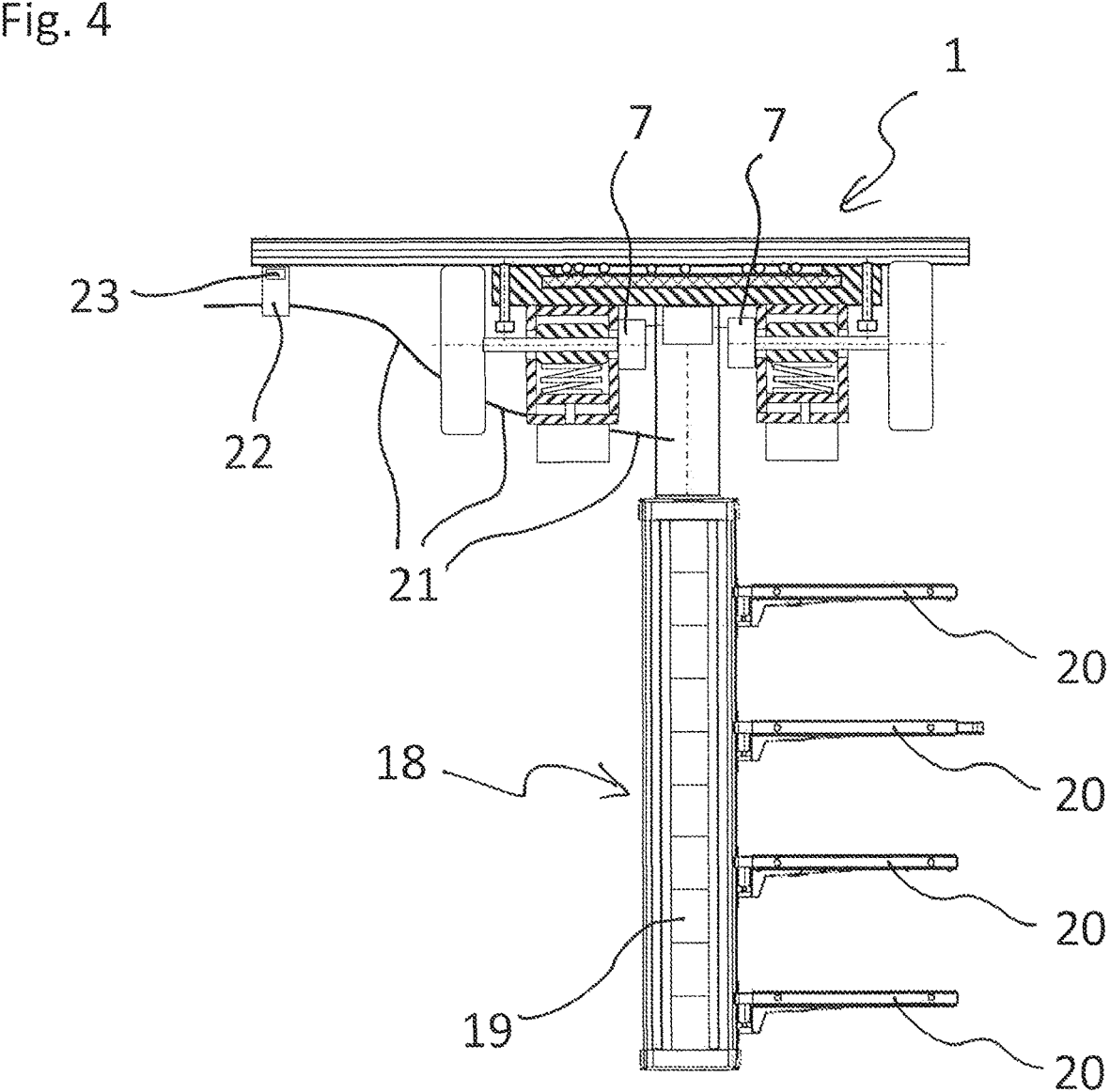
FIG. 4 shows an illustration of a medical device being a ceiling mounted support system or modular boom comprising the magnetic suspension system.

FIG. 4 shows an illustration of a medical device 18 as being a ceiling mounted support system or modular boom comprising the magnetic suspension system 1.

The ceiling mounted support system or boom is shown as a support head 19 provided with four platforms 20. Alternatively, another quantity of platforms 20 and/or other equipment elements, such as electric sockets, gas sockets, data connectors, drawers, can be provided.

Further, the medical device 18 comprises a supply main 21 for supplying the medical device 18 with energy, gases and control signals. Alternatively, the supply main does not supply all of the energy, the gases and the control signal but merely those which are necessary for operating the medical device 18. In case that there is no need to supply the medical device 18, e.g., merely being a support head with platforms for instruments, the supply main can be omitted and the drives 7 can be supplied by power stored in a battery attached to the carriage 3 or the medical device 18.

The medical device 18, furthermore, comprises magnetic carriers 22 (only one magnetic carrier is shown in FIG. 4) configured to support and guide the supply main 21, the magnetic carriers 22 respectively comprise a magnet 23 and are attached to the support structure 2 by magnetic force.

Figure 5:
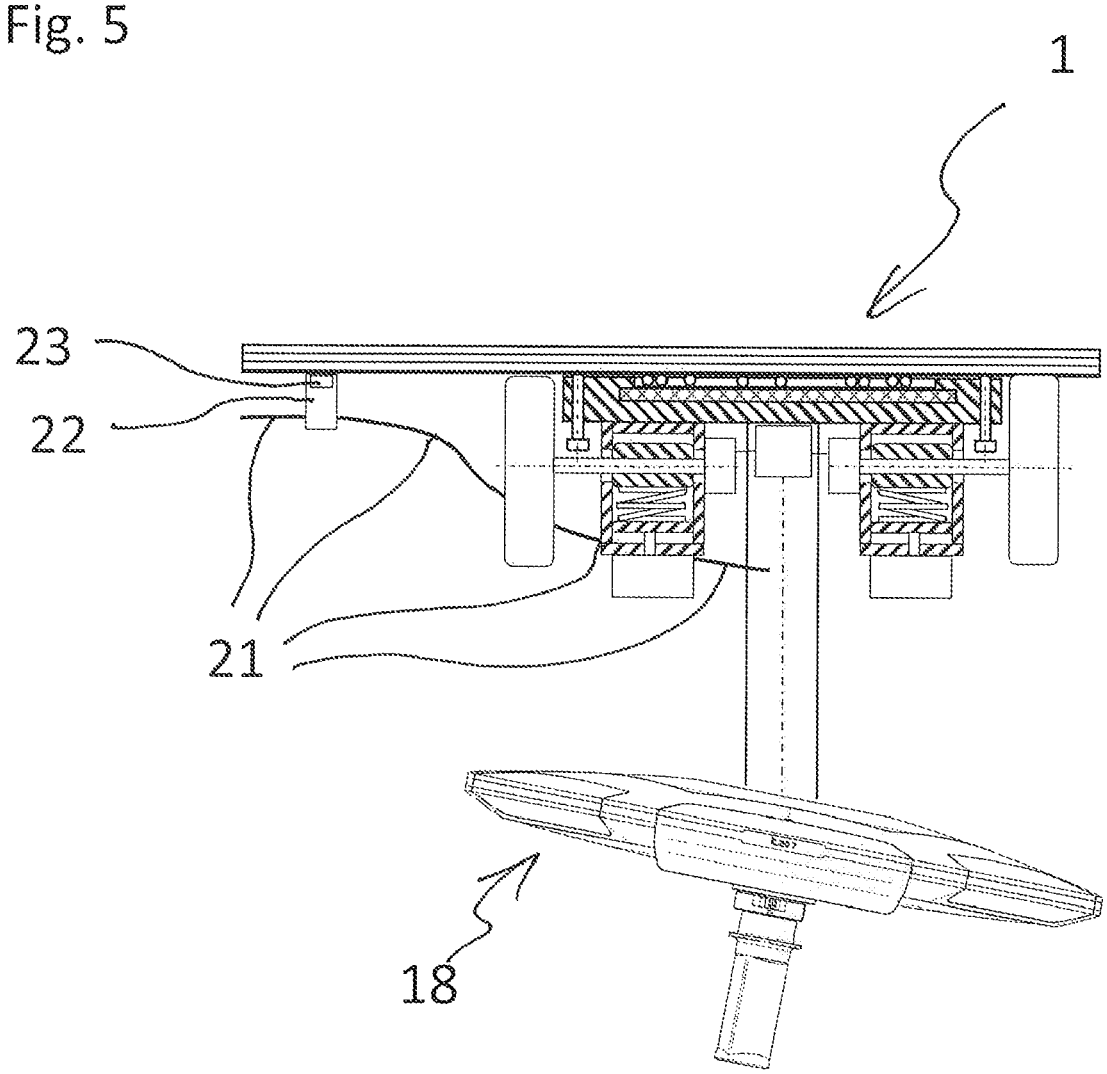
FIG. 5 shows an illustration of a medical device comprising a lighting system.

FIG. 5 shows an illustration of the medical device 18 comprising a lighting system and the magnetic suspension system 1. In this embodiment, an operating light is shown. However, alternatively, e.g., an examination light, an ambient light or a lamp for a specific task, such as fluorescence diagnostic can be provided. The lighting system is also supplied by means of the supply main 21. Alternatively, this medical device 18 can also be supplied with electric power by means of batteries or accumulators and the supply main 21 can be omitted.

Also in this embodiment, the medical device 18 comprises magnetic carriers 22 (only one magnetic carrier is shown in FIG. 5) configured to support and guide the supply main 21, the magnetic carriers 22 respectively comprise a magnet 23 and are attached to the support structure 2 by magnetic force.

Figure 6:
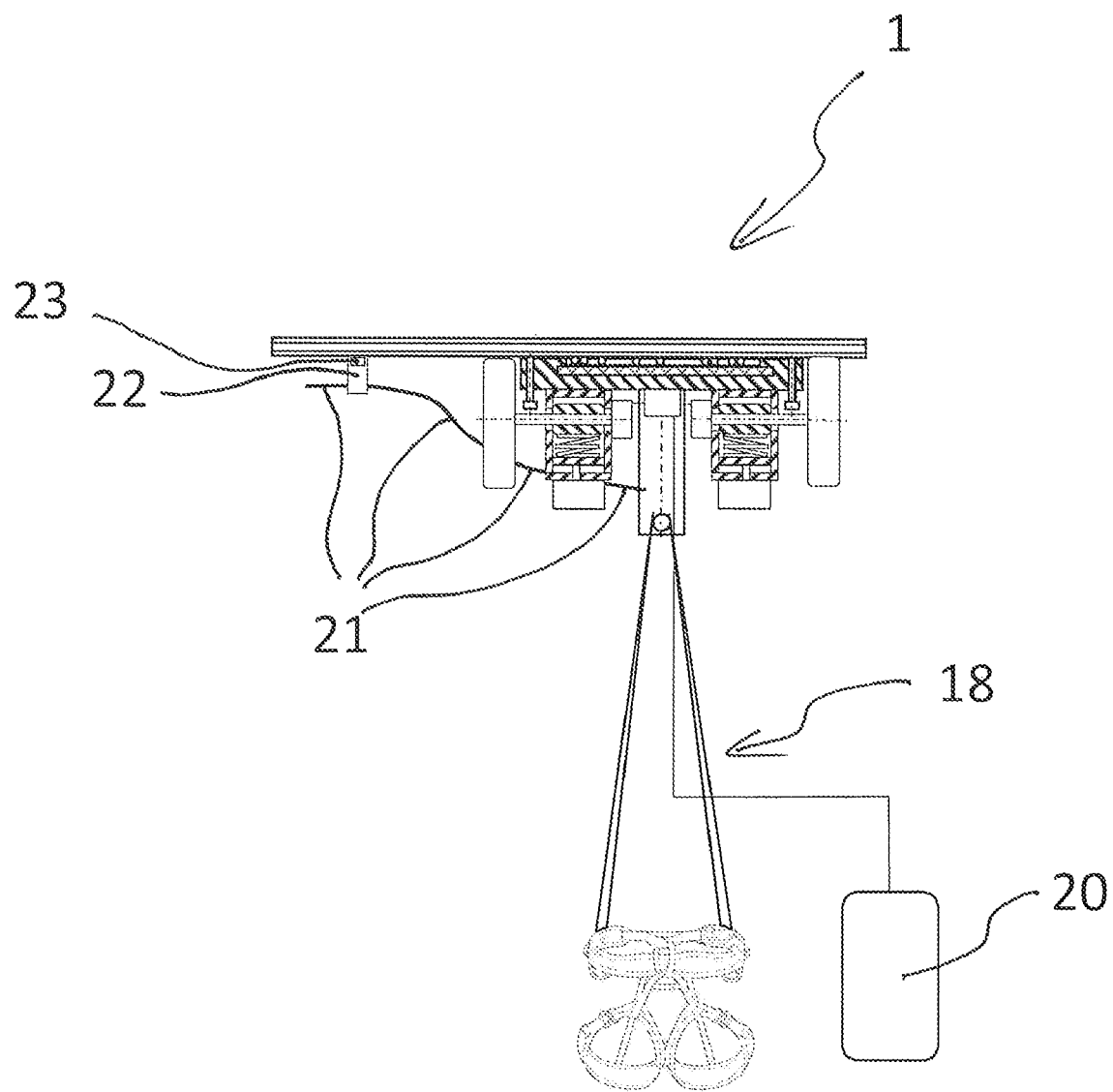
FIG. 6 shows an illustration of a medical device comprising a patient hoist.

FIG. 6 shows an illustration of a medical device 18 comprising a patient hoist and the magnetic suspension system 1. The patient hoist can be provided with a motorized lifting system for assisting rising and sitting and laying down. The lifting function can also be included in the remote control 20. The patient hoist is also supplied by means of the supply main 21. Alternatively, this medical device 18 can also be supplied with electric power by means of batteries or accumulators and the supply main 21 can be omitted.

Also in this embodiment, the medical device 18 comprises magnetic carriers 22 (only one magnetic carrier is shown in FIG. 6) configured to support and guide the supply main 21, the magnetic carriers 22 respectively comprise a magnet 23 and are attached to the support structure 2 by magnetic force.

In use, the carriage 3 can be moved by, firstly, rotating the carriage 3 into a predefined direction and, then, by travelling in the predefined direction. The carriage 3 is rotated by locking one of the two rollers 9 and driving the other of the two rollers 9 or by driving the two rollers 9 in a controlled manner in opposite directions or at different rotational speeds.

In the embodiment having more than two rollers 9, the actuator 7 configured to actuate the preload element 10 is actuated to press the defined roller 9 against the support structure 2. The respective preload element 10 is merely actuated for rollers 9 contributing to the requested motion of the carriage 3. In particular, rollers 9 for driving the carriage 3 in directions perpendicular with respect to another can be provided. Hence, the carriage 3 can be moved according to respective vector components in a Cartesian coordinate system.

The control device 8 can be controlled to move the motions as described, e.g., by manual control via the remote control 20. On the other hand, the control device 8 can be controlled to automatically move the carriage 3 to the requested position on the support structure. For executing the automatic control, the numbers of turns of each of the rollers 9 are defined, applied, and counted.

One of the ends of the supply main is attached to the carriage 3 or to the medical device 18. Therefore, the supply line 21 is trailed by the carriage 3 while being supported and guided by the magnetic carriers 22.

For removing the carriage 3 or the medical device 18 comprising the carriage 3, in the embodiment shown in FIG. 1, the bolts 14 are rotated such that they approach the support structure 2. When the bolts 14 abut against the support structure 2 and are further rotated in the same rotational direction, the carriage 3 and, therefore, the magnet 4 are pushed away from the support structure 2. Due to this reason, the magnetic force loses intensity and the carriage 3 (and the medical device 18) can be detached.

For removing the carriage 3 or the medical device 18 in the embodiments shown in FIGS. 2 and 3, the carriage 3 is moved to a specific position on the support structure 2. At this position, the carriage 3 either can be detached due to the loosen intensity of the magnetic force (embodiment shown in FIG. 2) or the detachable portion 16 of the support structure 2 can be removed together with the carriage 3 or the medical device 18 comprising the carriage 3.

While the invention has been illustrated and described in detail in the drawings and the foregoing description, such illustration and description are to be considered illustrative or exemplary and not restrictive. The invention is not limited to the disclosed embodiment. From reading the present disclosure, other modifications will be apparent to a person skilled in the art. Such modifications may involve other features, which are already known in the art and may be used instead of or in addition to features already described herein. In the claims, the word "comprising" does not exclude other elements or steps, and the indefinite article "a" or "an" does not exclude a plurality.

The invention claimed is:

1. A magnetic suspension system for a medical device, the magnetic suspension system comprising:
    a plate-shaped support structure having an area provided with a ferromagnetic characteristic, and
    a carriage comprising a magnet exerting a magnetic attraction force between the carriage and the support structure, wherein the carriage comprises a friction reducing device, and
    a drive device configured to drive a motion of the carriage upon the support structure in an arbitrary predetermined direction, the drive device being separate from the friction reducing device;
    wherein the medical device comprises a supply main for supplying the medical device with at least one of energy, gases and control signals, and magnetic carriers configured to support and guide the supply main, the magnetic carriers respectively comprising a magnet and being attachable to the support structure by magnetic force, wherein the medical device is configured to supply and carry medical apparatuses.

2. The magnetic suspension system of claim 1, wherein the drive device comprises an electric motor and a control device configured to actuate the drive device to drive the motion of the carriage in the predetermined direction.

3. The magnetic suspension system of claim 1, wherein the drive device comprises at least two rollers configured to roll upon the support structure.

4. The magnetic suspension system of claim 3, wherein the drive device comprises a preload element configured to press a defined roller against the support structure.

5. The magnetic suspension system of claim 4, wherein the drive device comprises an actuator configured to actuate the preload element to press the defined roller against the support structure.

6. The magnetic suspension system of claim 4, wherein the rollers comprise low-pressure tires.

7. The magnetic suspension system of claim 1, further comprising a removal device configured to remove the carriage from the support structure.

8. The magnetic suspension system of claim 7, wherein the carriage comprises the removal device configured to enlarge a distance between the magnet of the carriage and the support structure.

9. The magnetic suspension system of claim 8, wherein the removal device comprises a bolt configured to approach the support structure when being rotated in a predefined rotational direction.

10. The magnetic suspension system of claim 7, wherein the support structure comprises an area having a non-ferromagnetic characteristic, and the carriage is configured to enter the area having a non-ferromagnetic characteristic for being removed from the support structure.

11. The magnetic suspension system of claim 7, wherein the support structure comprises a detachable portion having an area provided with a ferromagnetic characteristic, the portion being detachable from a remaining portion of the support structure for removing the carriage located in this detachable portion.

12. The magnetic suspension system of claim 1, wherein the plate-shaped support structure is formed of steel.

13. The magnetic suspension system of claim 1, wherein the plate-shaped support structure is attached to a ceiling in a room.

14. The magnetic suspension system of claim 1, wherein the friction reducing device comprises balls to avoid static friction.

15. The magnetic suspension system of claim 1, wherein the magnet is a permanent magnet.

16. The magnetic suspension system of claim 2, wherein the control device is provided with a remote control.

17. The magnetic suspension system of claim 2, wherein the electric motor acts as a braking system to cause the carriage to stay in place.

18. The magnetic suspension system of claim 3, wherein the at least two rollers are driven by separate electric motors.

19. The magnetic suspension system of claim 4, wherein the preload element is formed by a coiled spring.

20. The magnetic suspension system of claim 4, wherein the preload element is configured to press a support block supporting a shaft of one of the defined roller towards the support structure.

* * * * *